(12) United States Patent
Hansen

(10) Patent No.: US 10,900,856 B2
(45) Date of Patent: Jan. 26, 2021

(54) SELF-RELEASING CLAMPING TOOL

(71) Applicant: Allan Hjorth Hansen, Charlotte, NC (US)

(72) Inventor: Allan Hjorth Hansen, Charlotte, NC (US)

( * ) Notice: Subject to any disclaimer, the term of this patent is extended or adjusted under 35 U.S.C. 154(b) by 248 days.

(21) Appl. No.: 16/175,573

(22) Filed: Oct. 30, 2018

(65) Prior Publication Data

US 2019/0128760 A1    May 2, 2019

Related U.S. Application Data

(60) Provisional application No. 62/578,966, filed on Oct. 30, 2017.

(51) Int. Cl.
*G01M 1/04* (2006.01)
*B25B 5/14* (2006.01)

(52) U.S. Cl.
CPC ............... *G01M 1/045* (2013.01); *B25B 5/14* (2013.01)

(58) Field of Classification Search
CPC ...... G01B 2210/10; G01B 21/26; G01B 3/12; G01B 5/255; G01M 1/045; B23Q 3/06; B23Q 16/006; B23Q 16/10
See application file for complete search history.

(56) References Cited

U.S. PATENT DOCUMENTS

| | | | |
|---|---|---|---|
| 9,186,777 B2 * | 11/2015 | Woods | B25B 11/02 |
| 2009/0278295 A1 * | 11/2009 | Ohnesorge | G01M 1/045 269/57 |
| 2016/0313206 A1 * | 10/2016 | Cavalli | G01M 1/045 |

* cited by examiner

*Primary Examiner* — Tyrone V Hall, Jr.

(57) ABSTRACT

A self-releasing clamping tool that mounts a wheel onto a wheel balancer. The clamping tool has an adapter plate and a planetary gear assembly. The planetary gear assembly is an adjustable support system that maintains the wheel in a desired orientation while being balanced. The planetary gear assembly has a central gear and a collection of gear studs. The gear studs are support members that can be repositioned to correspond to the lug holes of the wheel. The central gear is rotatably mounted onto the adapter plate and the gear studs are detachably mounted onto the adapter plate. The central gear synchronizes the motion of the gear studs and the gear studs are easily detached from the adapter plate. Thus, preventing damage when dropped. A central hole traverses through the assembly and plate to enable the clamping tool to be attached to the wheel balancer.

19 Claims, 13 Drawing Sheets

US 10,900,856 B2

SELF-RELEASING CLAMPING TOOL

The current application claims a priority to the U.S. Provisional Patent application Ser. No. 62/578,966 filed on Oct. 30, 2017.

FIELD OF THE INVENTION

The present invention relates generally to clamping systems. More specifically, the present invention is an adjustable wheel balancing clamping tool with an integrated damage-prevention system.

BACKGROUND OF THE INVENTION

While most vehicles on the road have unique features and characteristics, all are equipped with tires to transfer the torque from the drivetrain to the ground and propel the automobile. Numerous types of tires are available depending on the application and type of vehicle. As an example, a sports car will have widely different tires than a truck or an off-road vehicle. Balanced wheels are required in any vehicle to ensure the wheel spins accurately regardless of the external forces that results from the rotational movement or road imperfections. If the wheel is statically or dynamically imbalanced, the driver may experience vibrations in the vehicle.

Furthermore, excessive tire wear, and premature failure of the suspension components can occur if the wheels are out of balance. Numerous wheel balancing machines are available on the market, thus giving the consumer the option to choose a device that best suits their needs and budget. While each wheel balancer has individual options and features, the working principles remain largely the same throughout. The wheel is secured onto a balancing shaft, which rotates the wheel at various speeds, highlighting equilibrium defects in the wheel assembly. The machine indicates where the user must place weights of various sizes or make adjustments to achieve the desired result.

A critical step in the wheel balancing process is securing the wheel to the balancing machine. The combination of tight tolerances and the relatively high rpm demands precision and consistency at every step of the balancing process. The technician must ensure the wheel is centered perfectly onto the shaft, and that it remains fixated during the balancing process to eliminate the possibility of errors. Traditionally the wheel is attached to the machine using a variety of clamping tools. The accuracy with which the wheel is balanced is directly proportional to the ability of the clamping tool to secure, center and torque the wheel during the process. The best wheel balancing clamping tools use studs to apply pressure on the lug nut holes of the wheel assembly, in the same fashion wheels are mounted onto a vehicle. Due to the wide range of bolt patterns available, these studs are designed to replicate a traditional wheel lug nut.

Clamping tools for wheel balancers are designed to a high level of precision, and usually they are manufactured out of hardened metal alloys to ensure accurate usability even after extended cycling loading cycles. Due to the working environment to which the tool is exposed, it is not uncommon for users to accidentally drop the device on the ground. If the clamping tool is dropped on the floor, it is not uncommon for the studs to break or bend damaging the unit. Even if the clamping tool remains in one piece, the impact forces can affect the accuracy of the tool. If the tolerances have been compromised, and the wheel is balanced using the inaccurate clamping tool, the rim will inevitably inherit the inaccuracies. Replacing these tools may not always be a possibility, especially in lower cost applications, therefore in numerous cases the user continues to use the wheel-clamping tools without being aware of the offset tolerances. As a result, the wheels are not balanced accurately. The only way to guarantee a perfectly balanced, vibration free wheel is to clamp and center the rim onto the balancer in the same virtually identical fashion it is attached to the vehicle. The present invention aims to solve some of these problems by disclosing a clamping tool that is impact resistant, and self-releasing when dropped.

DETAIL DESCRIPTIONS OF THE INVENTION

All illustrations of the drawings are for the purpose of describing selected versions of the present invention and are not intended to limit the scope of the present invention.

Referring to FIG. 1 through FIG. 13, the present invention, the self-releasing clamping tool, is a device that enables a user to reliably mount a wheel on a wheel balancing machine in a desired orientation. To accomplish this, the present invention employs a damage mitigation system that causes the studs attached to a wheel balancing plug plate to become quickly detached from the plug plate when the plug plate is dropped. This prevents the studs or plug plate from being bent or deformed by being dropped. In addition to damage mitigation, the present invention makes use of a stud adjustment system that enables the present invention to function as a universal wheel balancing tool. To achieve the above-described functionalities, the present invention comprises an adapter plate 1, a central hole 2, and a planetary gear assembly 3. The adapter plate 1 is a plug plate that is designed to accommodate wheels of varying shape and size.

Figure 1:
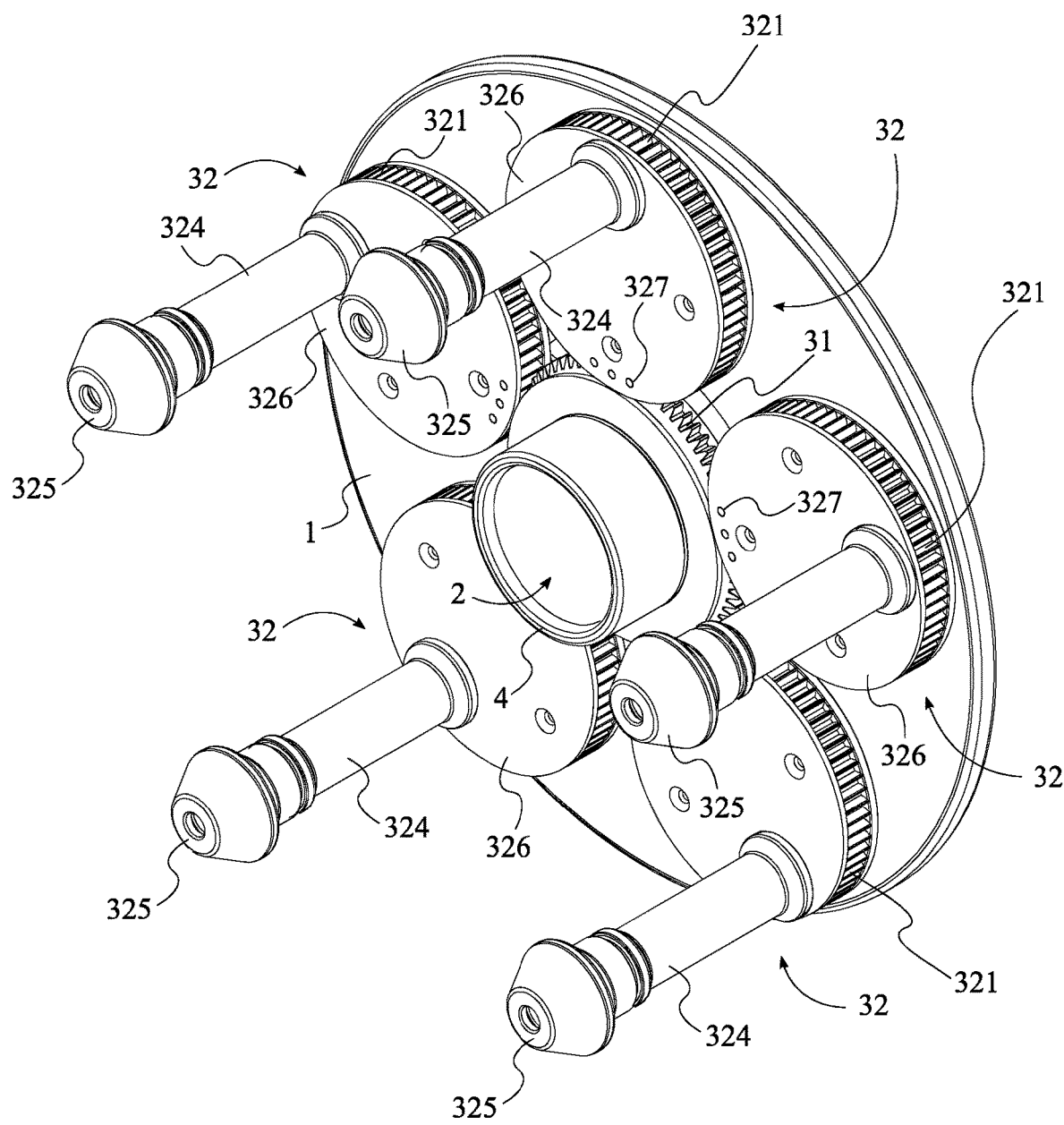
FIG. 1 is a front perspective view of the present invention with the lock plate removed.
Figure 4:
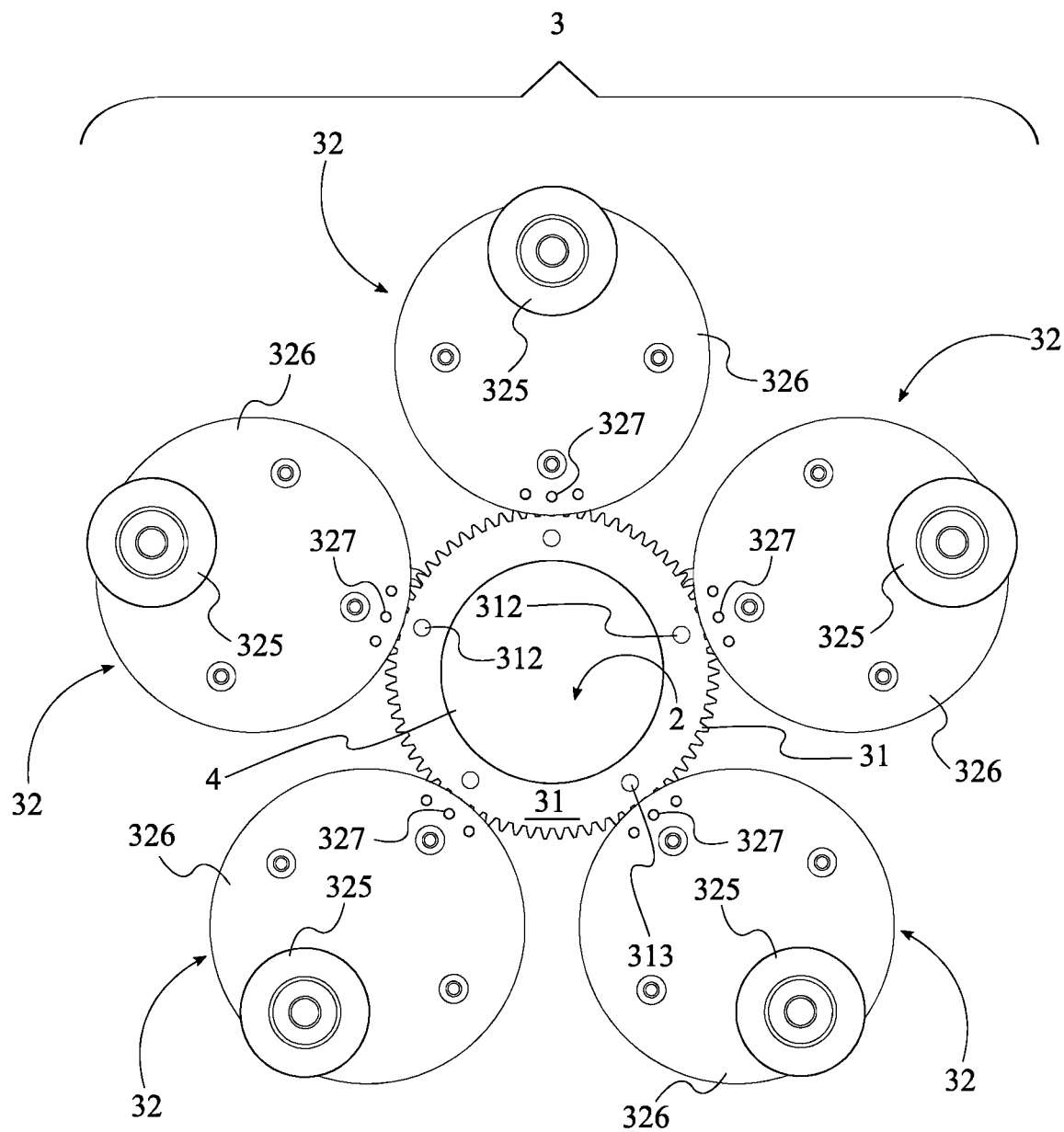
FIG. 4 is a front view of the planetary gear assembly used in the present invention.
Figure 5:
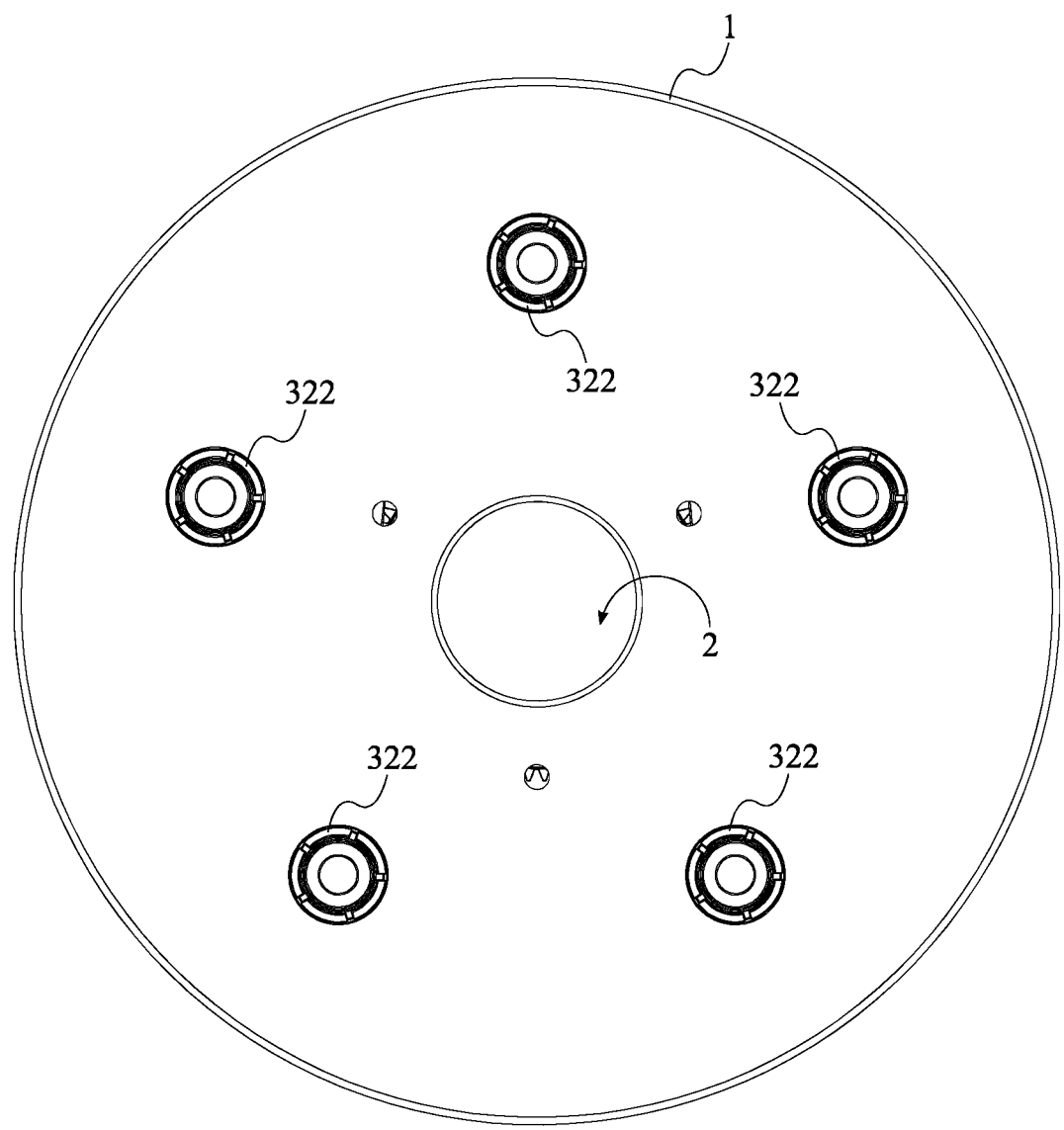
FIG. 5 is a rear view of the present invention.
Figure 6:
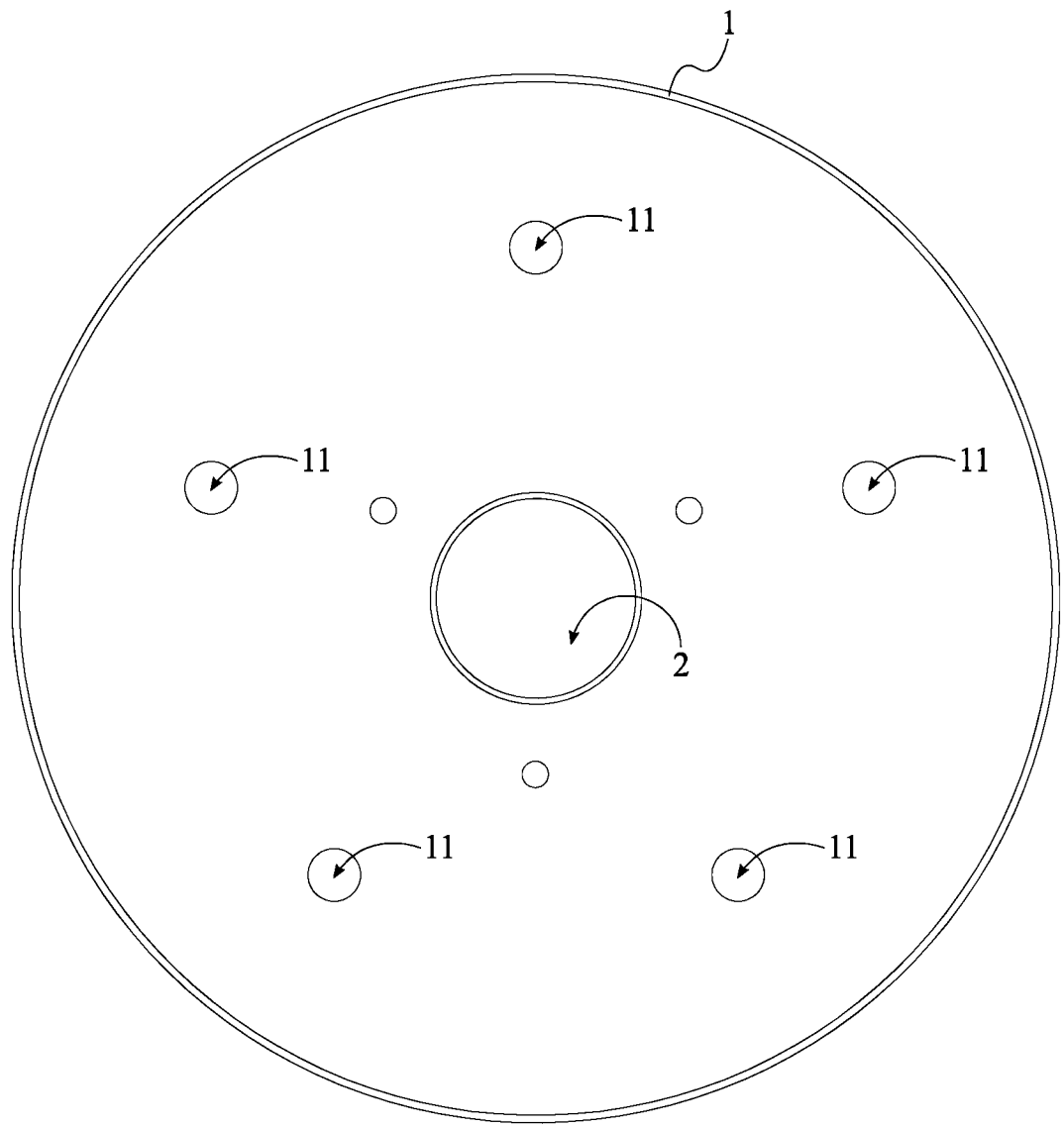
FIG. 6 is a rear view of the adapter plate used in the present invention.
Figure 7:
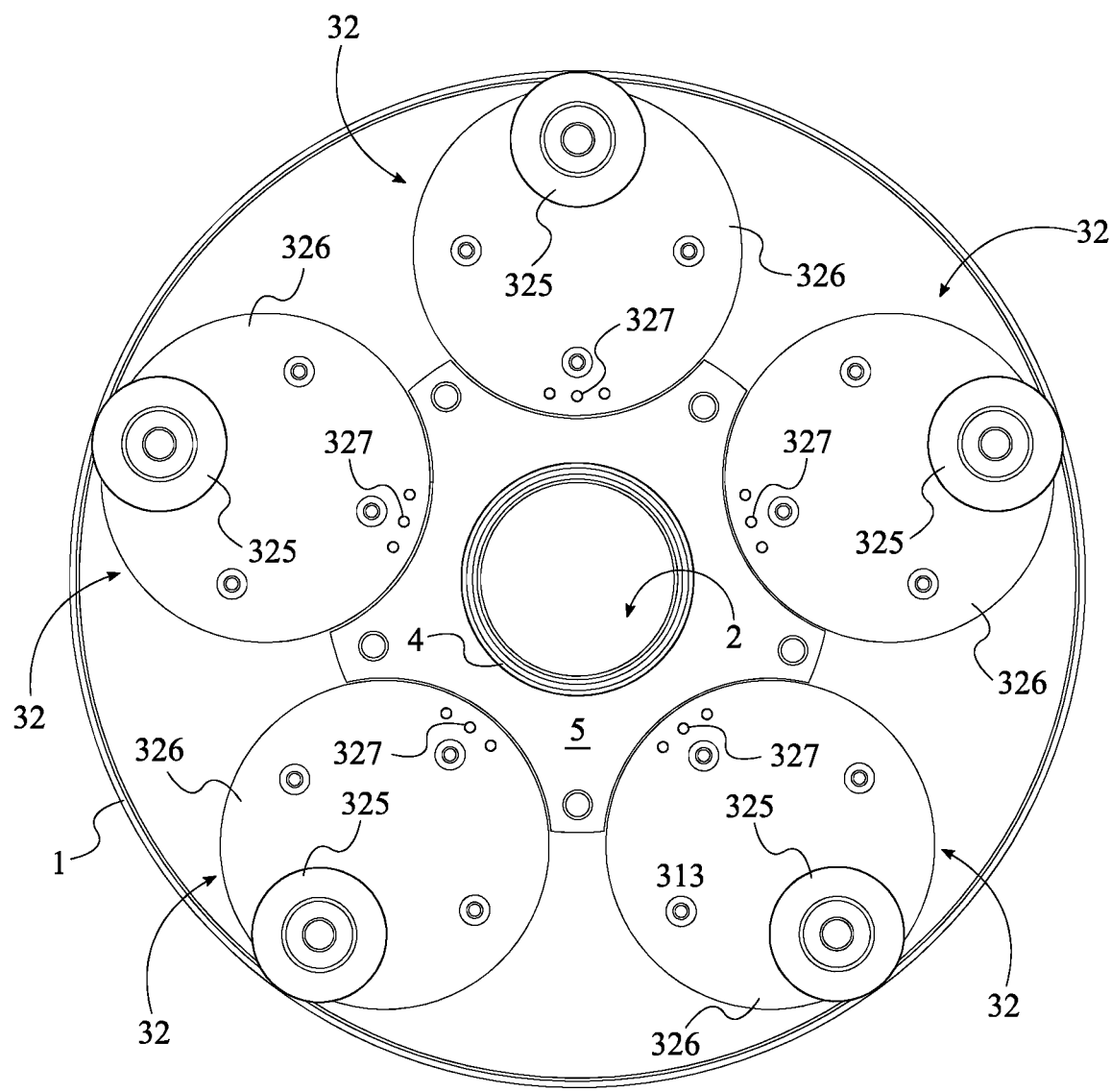
FIG. 7 is a front view of the present invention with the lock plate installed.
Figure 8:
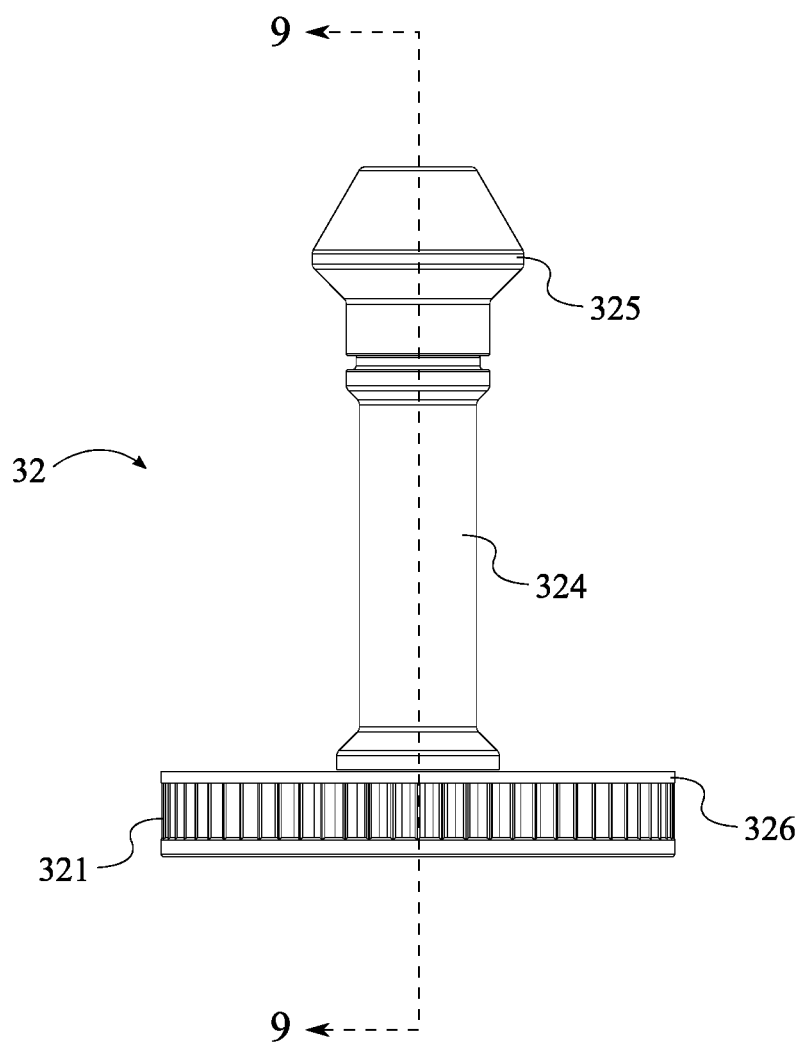
FIG. 8 is a front view of a single gear stud used in the present invention.
Figure 13:
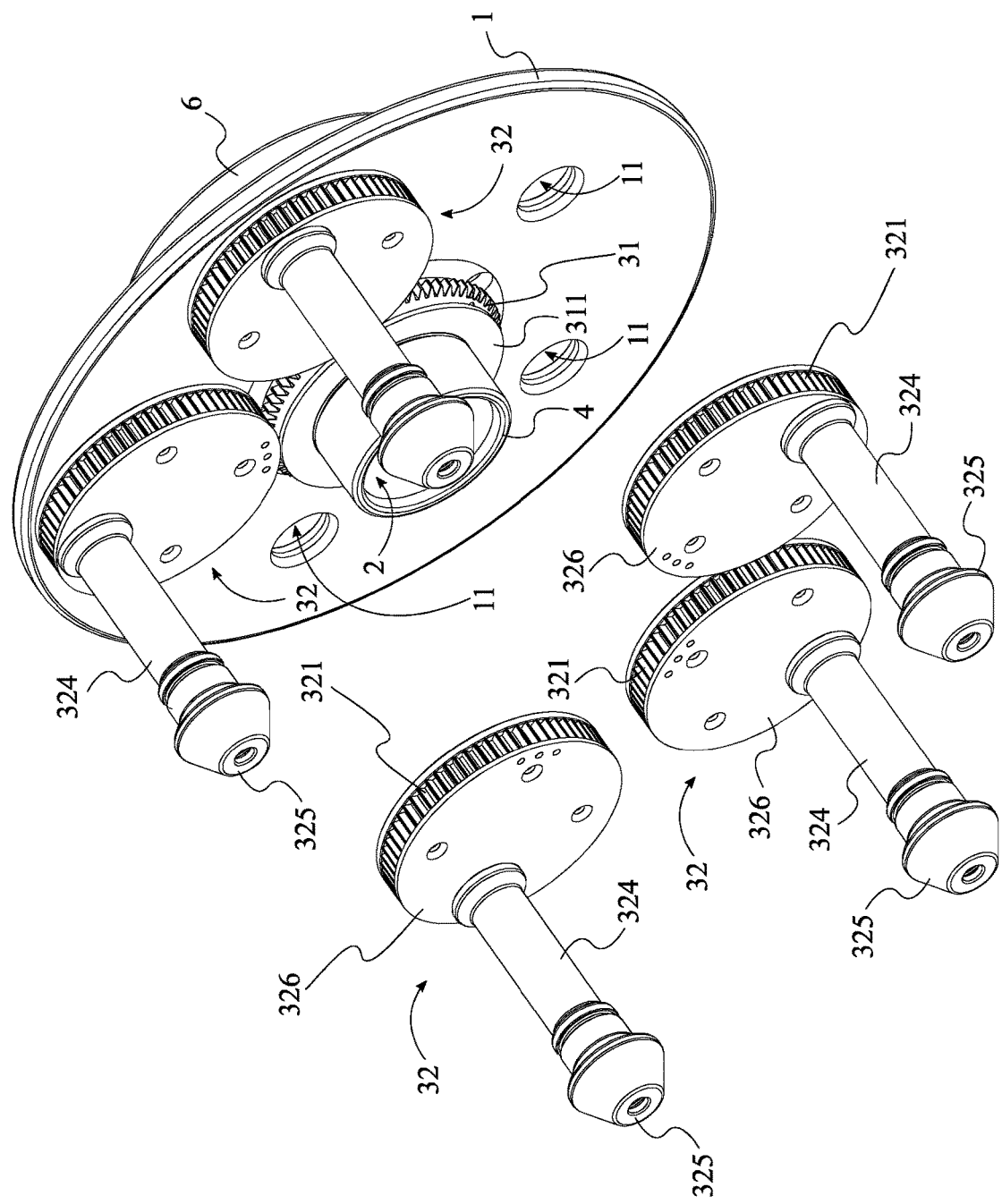
FIG. 13 is a front perspective view of the present invention with several of the gear studs detached.

Referring to FIG. 1, FIG. 4, and FIG. 13, the central planetary gear assembly 3 is an adjustable mounting system with a collection of studs that can be repositioned to accommodate wheels of varying shape and size. To accomplish this, the planetary gear assembly 3 comprises a central gear 31 and a plurality of gear studs 32. Each of the plurality of gear studs 32 functions similarly to a plug-in stud that retains the wheel being balanced in a desired orientation. Additionally, the central gear 31 and the plurality of gear studs 32 work in concert to function as a synchronized mounting system that can be adjusted based on the specifications of the wheel being balanced. The central gear 31 is rotatably mounted onto the adapter plate 1. As a result, the central gear 31 is able to rotate about a central axis without becoming dismounted from the adapter plate 1. The plurality of gear studs 32 is detachably mounted onto the adapter plate 1. Consequently, each of the plurality of gear studs 32 is able to break away from the adapter plate 1 when the adapter plate 1 is dropped. Preferably, each of the plurality of gear studs 32 is rotatably mounted onto the adapter plate 1. The plurality of gear studs 32 is distributed around the central gear 31. Further, the plurality of gear studs 32 is mechanically engaged to the central gear 31. As a result, the rotation of each of the plurality of gear studs 32 is synchronized by the rotation of the central gear 31. Accordingly, the user is able to reposition the plurality of gear studs 32 to correspond to the lug holes of the wheel being balanced.

Figure 2:
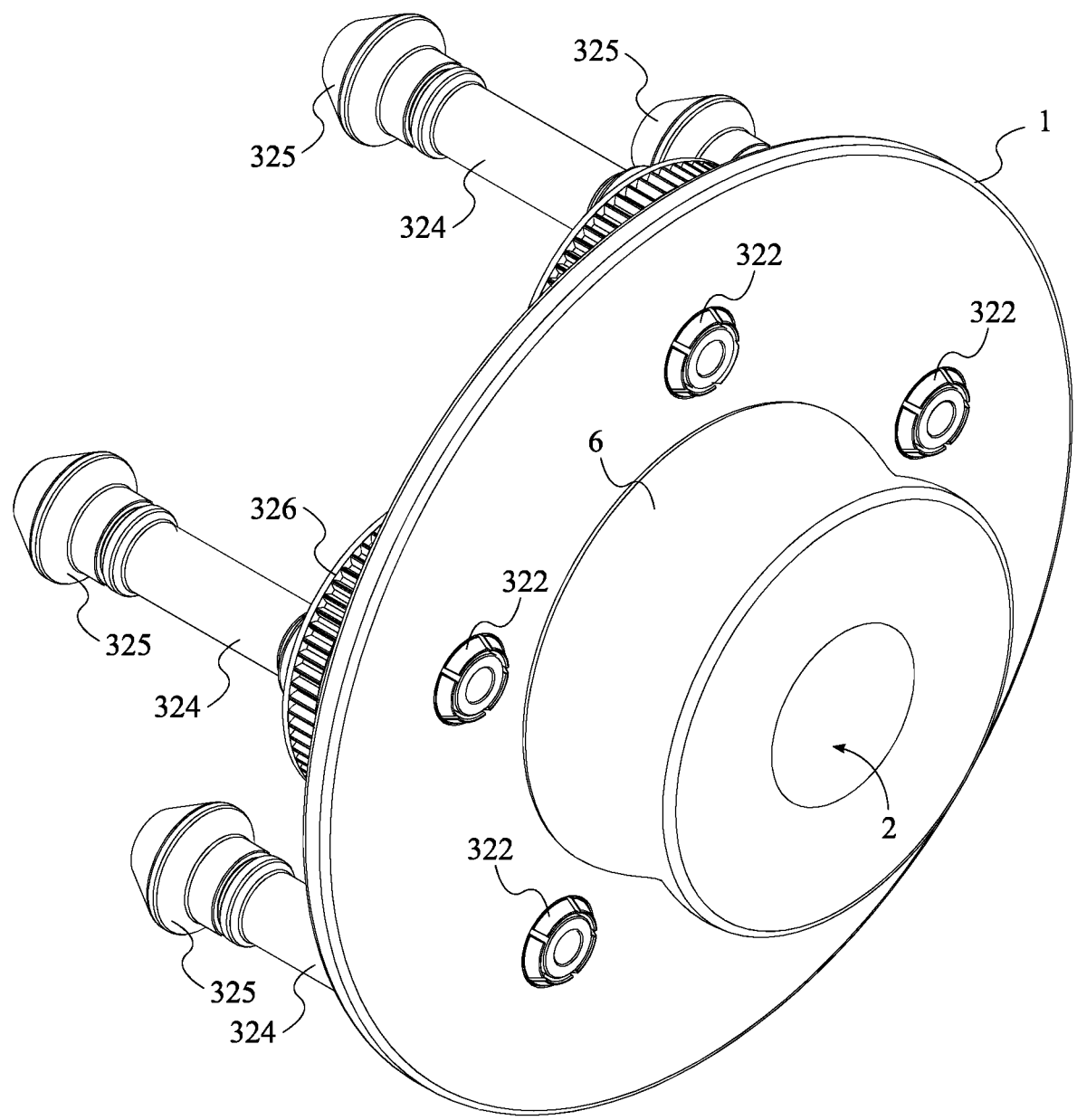
FIG. 2 is a rear perspective view of the present invention.
Figure 3:
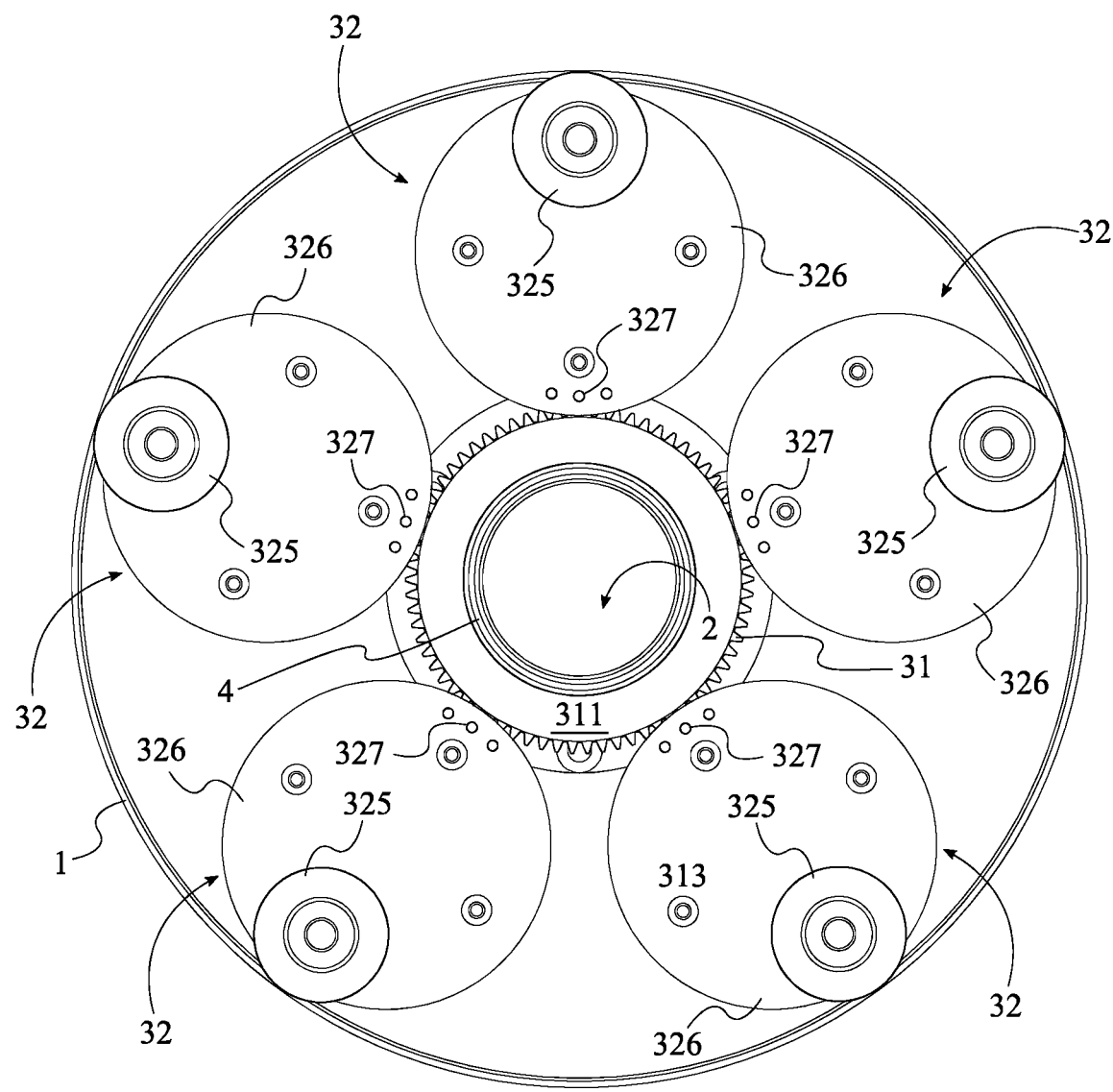
FIG. 3 is a front view of the present invention.

Referring to FIG. 1, FIG. 2, and FIG. 4, because the present invention is designed to be used with a traditional wheel balancing machine, the central hole 2 normally traverses through the central gear 31 and the adapter plate 1. Additionally, the central hole 2 and the central gear 31 are concentrically aligned to the adapter plate 1. Thus positioned, the central hole 2 enables the present invention to be slid onto the rotating axle of the wheel balancing machine. Preferably, the present invention comprises an adjustable clamp 6. The adjustable clamp 6 is adjacently mounted to the adapter plate 1, opposite to the central gear 31. As a result, the adjustable clamp 6 is able to press the planetary gear assembly 3 against the wheel being balanced. Thus, clamping the wheel in place on the wheel balancing machine and ensuring an accurate balancing operation.

Referring to FIG. 1 and FIG. 8 through FIG. 10, as described above, each of the plurality of gear studs 32 includes a damage mitigation system. Specifically, each of the plurality of gear studs 32 comprises a base gear 321 and a release mechanism 322. The base gear 321 is mechanically engaged to the central gear 31. As a result, rotating the central gear 31 causes the base gear 321 to rotate. Thus, enabling the user to reposition the plurality of gear studs 32 to accommodate wheels of varying shape and size. The release mechanism 322 is a coupling system that enables the plurality of gear studs 32 to become decoupled from the adapter plate 1 when subjected to external forces that exceed a predetermined threshold. As such, the release mechanism 322 is connected in between the base gear 321 and the adapter plate 1. Accordingly, the release gear becomes disengaged when the adapter plate 1 is dropped. Thus, preventing the plurality of gear studs 32 from becoming bent or otherwise damaged. Preferably, base gear 321 is rotatably mounted onto the release mechanism 322 so that the user can adjust the position of the gear stud 32 to accommodate wheels of varying shape and size. Additionally, the release mechanism 322 allows the user to reassemble and service the present invention, using only basic hand-tools or no tools at all. Further, numerous other types of release mechanisms 322 may be integrated into the present invention, including but not limited to snap fit clips, ball bearings, magnetic attachments, expanding gaskets, wave spring tabs, retaining rings, or press fit O-rings.

Referring to FIG. 1 and FIG. 8 through FIG. 10, preferably the present invention is designed with a consumable release mechanism 322 that can be disposed once the adapter plate 1 has been dropped and the plurality of gear studs 32 has been decoupled from the adapter plate 1. To accomplish, this the present invention comprises a plurality of mounting holes 11. Additionally, each of the plurality of gear studs 32 further comprises an insert-receiving receptacle 323. The plurality of mounting holes 11 normally traverses through the adapter plate 1. As a result, each of the plurality of mounting holes 11 enables a single gear stud 32 to be mounted onto the adapter plate 1. The insert-receiving receptacle 323 normally traverses through the base gear 321. Additionally, the release mechanism 322 is rotatably engaged within the insert-receiving receptacle 323. Accordingly, the gear stud 32 is able to be adjusted by being rotated about the release mechanism 322. The release mechanism 322 for each of the plurality of gear studs 32 is engaged within a corresponding hole 12 from the plurality of mounting holes 11. Consequently, the release mechanism 322 forms the connector that is used to mount the gear stud 32 onto the adapter plate 1. Further, the release mechanism 322 is designed to fail before the gear stud 32 experiences sufficient force to become deformed or otherwise damaged.

Referring to FIG. 1, FIG. 6, FIG. 9, and FIG. 11, in a first alternative embodiment, the release mechanism 322 is a reusable fastener that becomes decoupled when the plurality of gear studs 32 impacts an external object with sufficient force. In the first alternative embodiment the release mechanism 322 comprises a coupling insert 3221, a retaining ring 3222, and an annular groove 3223. The coupling insert 3221 is a rigid protrusion that is designed to be detachably mated to a corresponding receptacle. Additionally, the coupling insert 3221 is adjacently connected to the adapter plate 1. As a result, the coupling insert 3221 remains permanently affixed to the adapter plate 1 when the plurality of gear studs 32 become decoupled from the adapter plate 1. To facilitate this, the annular grove laterally traverses into the insert-receiving receptacle 323. Additionally, the retaining ring 3222 is mounted within the annular groove 3223. As a result, the retaining ring 3222 is maintained in a position that enables the coupling insert 3221 to be rapidly decoupled from the base gear 321. Specifically, the coupling insert 3221 is engaged into the insert-receiving receptacle 323 and the retaining ring 3222. Accordingly, the coupling insert 3221 is retained within the insert-receiving receptacle 323 by the retaining ring 3222. This coupling is sufficiently robust to support the weight of a tire, yet responsive enough to be disengaged when the gear stud 32 is subjected to a sufficiently violent force. Preferably, the retaining ring 3222 is a c-clip.

Figure 9:
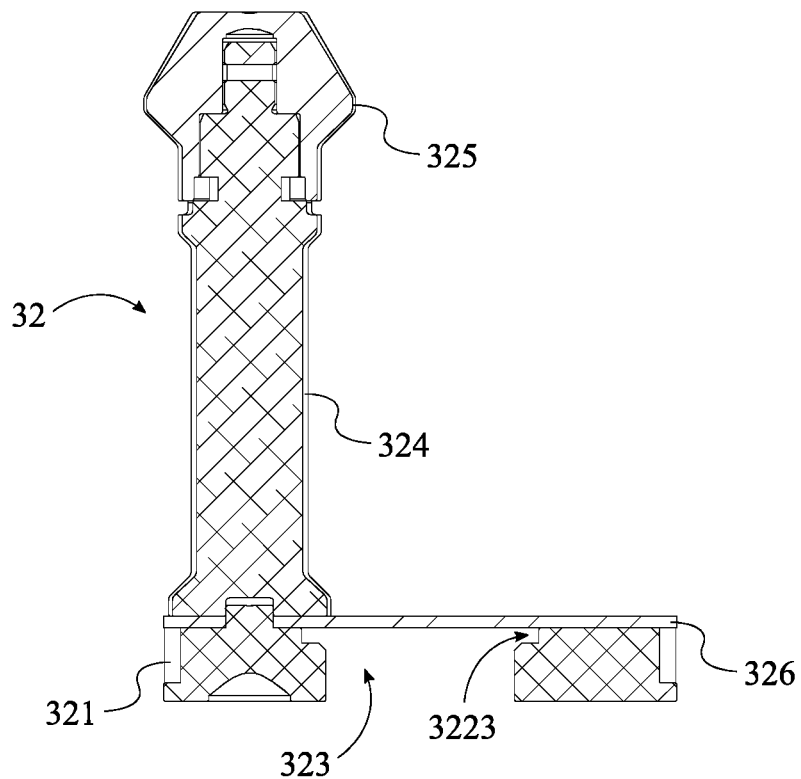
FIG. 9 is a left-side sectional view of the present invention taken along line 9-9 in FIG. 8.
Figure 10:
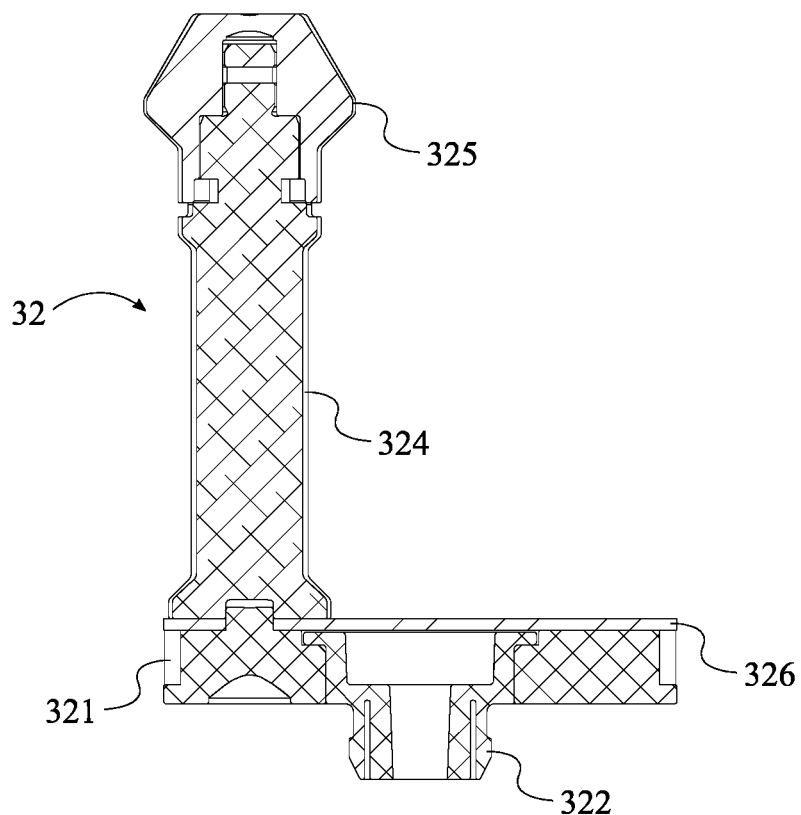
FIG. 10 is the left-side sectional view of the present invention showing the release mechanism comprising a disposable insert.
Figure 11:
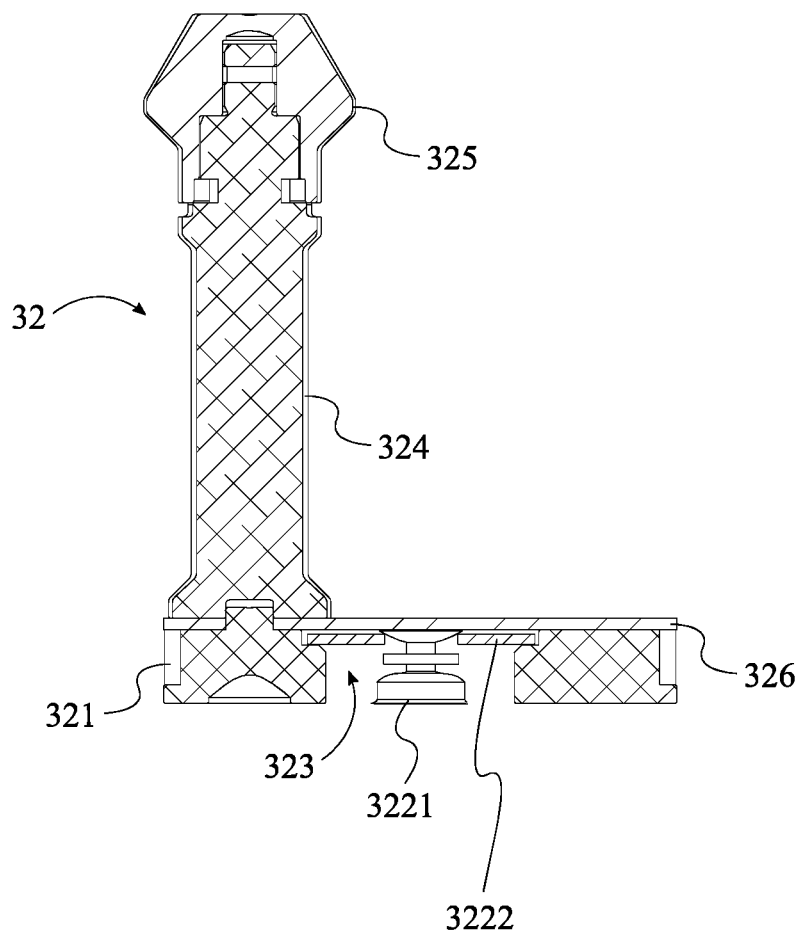
FIG. 11 is the left-side sectional view of a first alternative embodiment of the present invention showing the release mechanism comprising a permanently affixed coupling insert.
Figure 12:
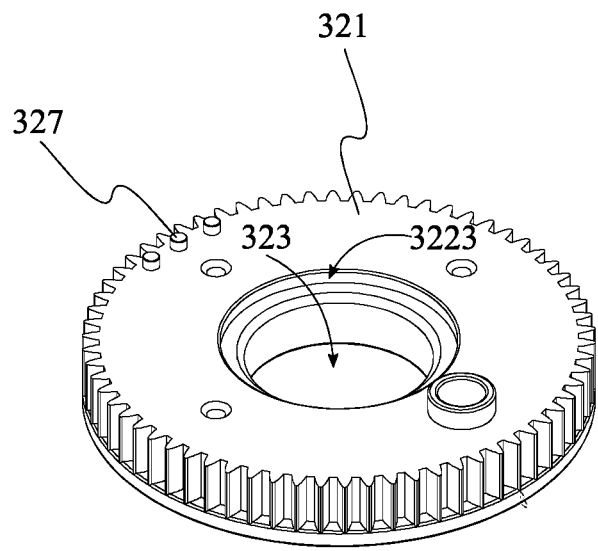
FIG. 12 is a perspective view of the base gear used in the present invention with the lock plate removed.

Referring to FIG. 1, and FIG. 9, the plurality of gear studs 32 is designed to be a connective support system that enables the adapter plate 1 to be attached to the wheel. To that end, each of the plurality of gear studs 32 further comprises a support stud 324, a connector tip 325, and a top plate 326. The support stud 324 is a rigid rod that extends through the lug holes of the wheel. The base gear 321 is terminally attached to the support stud 324. Additionally, the support stud 324 is positioned opposite to the adapter plate 1, across the base gear 321. Thus positioned, the support stud 324 is designed to be inserted into the lug hole of the wheel and used to rotate the wheel at a desired rate during wheel balancing operations. Preferably, the support stud 324 is detachably mounted onto the base gear 321. As such, embodiments of the present invention use a secondary release mechanism 322 to mount the support stud 324 onto the base gear 321. These embodiments feature damage mitigation systems that decouple the support stud 324 from the base gear 321, rather than the entire gear stud 32 from the adapter plate 1. The connector tip 325 is a detachable fastener that is terminally attached to the support stud 324, opposite to the base gear 321. Thus positioned, the connector tip 325 facilitates mounting and retaining the present invention on the wheel. The top plate 326 is adjacently connected to the base gear 321. Additionally, the top plate 326 is positioned in between the support stud 324 and the base gear 321. As a result, the top plate 326 protects the base gear 321 from being damaged by hazards in the external environment.

Referring to FIG. 1, FIG. 3, FIG. 4, and FIG. 7, the present invention is designed to mount the wheel onto the wheel balancing machine, such that the wheel balancing machine rotates the wheel about a central axis of the wheel. To facilitate this, the present invention comprises a collar 4, a lock plate 5, and an annular cover plate 311. The collar 4 is laterally mounted to the central hole 2. Accordingly, the collar 4 ensures that a central axis of the adapter plate 1 is colinearly aligned to the central axis of the wheel while the plurality of gear studs 32 is engaged into the lug holes of the wheel. The central gear 31 is laterally and rotatably mounted around the collar 4. As a result, the adapter plate 1 and the planetary gear assembly 3 function as a universal coupling mechanism that can be used to mount wheels of varying shape and size onto a traditional wheel balancing machine. Specifically, the position of the plurality of gear studs 32 can be adjusted to correspond to the dimensions of the wheel being balanced. Thus, enabling wheels of varying shape and size to be attached to the adapter plate 1, which is then mounted onto the wheel balancing machine. The lock plate 5 is mounted onto the adapter plate 1 and positioned over the central gear 31. Additionally, the annular cover plate 311 is rotatably mounted in between the central gear 31 and the lock plate 5. Consequently, the lock plate 5 and the annular cover plate 311 prevent the central gear 31 from becoming detached from the adapter plate 1. Further, the central hole 2 traverses through the lock plate 5 and the annular cover plate 311 is concentrically aligned to the central hole 2. As a result, the lock plate 5 and the annular cover plate 311 do not prevent the present invention from being mounted onto the wheel balancing machine.

Referring to FIG. 1 and FIG. 4, as described above, the present invention is designed to facilitate balancing wheels of varying shape and size. To that end, the present invention further comprises a plurality of alignment indicia 312. Additionally, each of the plurality of gear studs 32 further comprises at least one alignment marker 327. This enables the user to rearrange the plurality of gear studs 32 to correspond to the location of the lug holes of the wheel being balanced. Specifically, the plurality of alignment indicia 312 is distributed around the central gear 31. Additionally, the alignment marker 327 is superimposed onto the gear stud. Further, the alignment marker 327 for each of the plurality of gear studs 32 is aligned to a corresponding indicium 313 from the plurality of alignment indicia 312. As a result, the user is able to arrange the plurality of gear studs 32 to correspond to the lug holes of the wheel by aligning the alignment markers 327 with the correct alignment indicia 312. Specifically, each of the support studs 324 can be aligned to a corresponding lug hole by lining up the alignment marker 327 with the corresponding indicium 313. Accordingly, the plurality of alignment indicia 312 may include markers that indicate the shape and size of the wheel being balanced. The user is able to employ the present invention to couple the wheel to the wheel balancing machine by lining up the lining up alignment marker 327 for each of the plurality of gear studs 32 with the corresponding indicium 313 for the wheel. In alternative embodiments of the present invention, the plurality of alignment indicia 312 is superimposed onto the lock plate 5. Additionally, the alignment marker 327 is superimposed onto the top plate 326. As a result, the user is able to accurately reposition the planetary gear assembly 3 while the central gear 31 and the base gear 321 remain shielded from hazards in the external environment.

Although the invention has been explained in relation to its preferred embodiment, it is to be understood that many other possible modifications and variations can be made without departing from the spirit and scope of the invention as hereinafter claimed.

What is claimed is:
1. A self-releasing clamping tool comprising:
an adapter plate;
a central hole;
a planetary gear assembly;
the planetary gear assembly comprising a central gear and a plurality of gear studs;
the central gear being rotatably mounted onto the adapter plate;
the plurality of gear studs being detachably mounted onto the adapter plate;
the plurality of gear studs being distributed around the central gear;
the plurality of gear studs being mechanically engaged to the central gear;
the central hole normally traversing through the central gear and the adapter plate; and
the central hole and the central gear being concentrically aligned to the adapter plate;
a plurality of alignment indicia;
each of the plurality of gear studs further comprising at least one alignment marker;
the plurality of alignment indicia being distributed around the central gear;
the alignment marker being superimposed onto the gear stud; and
the alignment marker for each of the plurality of gear studs being aligned to a corresponding indicium from the plurality of alignment indicia.
2. The self-releasing clamping tool as claimed in claim 1 comprising:
each of the plurality of gear studs comprising a base gear and a release mechanism; and
the release mechanism being connected in between the base gear and the adapter plate.
3. The self-releasing clamping tool as claimed in claim 2 comprising:
a plurality of mounting holes;
each of the plurality of gear studs further comprising an insert-receiving receptacle;
the plurality of mounting holes normally traversing through the adapter plate;
the insert-receiving receptacle normally traversing through the base gear;
the release mechanism being rotatably engaged within the insert-receiving receptacle; and
the release mechanism for each of the plurality of gear studs being engaged within a corresponding mounting hole from the plurality of mounting holes.
4. The self-releasing clamping tool as claimed in claim 2 comprising:
each of the plurality of gear studs further comprising an insert-receiving receptacle;

the release mechanism comprising a coupling insert, a retaining ring, and an annular groove;
the insert-receiving receptacle normally traversing through the base gear;
the coupling insert being adjacently connected to the adapter plate;
the annular grove laterally traversing into the insert-receiving receptacle;
the retaining ring being mounted within the annular groove; and
the coupling insert being engaged into the insert-receiving receptacle and the retaining ring.

5. The self-releasing clamping tool as claimed in claim 2, wherein the base gear being rotatably mounted to the release mechanism.

6. The self-releasing clamping tool as claimed in claim 1 comprising:
each of the plurality of gear studs further comprising a base gear and a support stud;
the base gear being terminally attached to the support stud; and
the support stud being positioned opposite to the adapter plate, across the base gear.

7. The self-releasing clamping tool as claimed in claim 6 comprising:
each of the plurality of gear studs further comprising a connector tip; and
the connector tip being terminally attached to the support stud, opposite to the base gear.

8. The self-releasing clamping tool as claimed in claim 6 comprising:
each of the plurality of gear studs further comprising a top plate;
the top plate being adjacently connected to the base gear; and
the top plate being positioned in between the support stud and the base gear.

9. The self-releasing clamping tool as claimed in claim 1 comprising:
a collar;
the collar being laterally mounted to the central hole; and
the central gear being laterally and rotatably mounted around the collar.

10. The self-releasing clamping tool as claimed in claim 1 comprising:
a lock plate;
the lock plate being mounted onto the adapter plate;
the lock plate being positioned over the central gear; and
the central hole traversing through the lock plate.

11. The self-releasing clamping tool as claimed in claim 10 comprising:
an annular cover plate;
the annular cover plate being rotatably mounted in between the central gear and the lock plate; and
the annular cover plate being concentrically aligned to the central hole.

12. The self-releasing clamping tool as claimed in claim 1 comprising:
an adjustable clamp; and
the adjustable clamp being adjacently mounted to the adapter plate, opposite to the central gear.

13. A self-releasing clamping tool comprising:
an adapter plate;
a central hole;
a planetary gear assembly;
a collar;
a lock plate;
a plurality of alignment indicia;
an adjustable clamp;
the planetary gear assembly comprising a central gear and a plurality of gear studs;
each of the plurality of gear studs comprising a base gear, a release mechanism, a support stud, and at least one alignment marker;
the central gear being rotatably mounted onto the adapter plate;
the plurality of gear studs being detachably mounted onto the adapter plate;
the plurality of gear studs being distributed around the central gear;
the plurality of gear studs being mechanically engaged to the central gear;
the central hole normally traversing through the central gear and the adapter plate;
the central hole and the central gear being concentrically aligned to the adapter plate;
the release mechanism being connected in between the base gear and the adapter plate;
the base gear being terminally attached to the support stud;
the support stud being positioned opposite to the adapter plate, across the base gear;
the collar being laterally mounted to the central hole;
the central gear being laterally and rotatably mounted around the collar;
the lock plate being mounted onto the adapter plate;
the lock plate being positioned over the central gear;
the central hole traversing through the lock plate;
the plurality of alignment indicia being distributed around the central gear;
the alignment marker being superimposed onto the gear stud;
the alignment marker for each of the plurality of gear studs being aligned to a corresponding indicium from the plurality of alignment indicia; and
the adjustable clamp being adjacently mounted to the adapter plate, opposite to the central gear.

14. The self-releasing clamping tool as claimed in claim 13 comprising:
a plurality of mounting holes;
each of the plurality of gear studs further comprising an insert-receiving receptacle;
the plurality of mounting holes normally traversing through the adapter plate;
the insert-receiving receptacle normally traversing through the base gear;
the release mechanism being rotatably engaged within the insert-receiving receptacle; and
the release mechanism for each of the plurality of gear studs being engaged within a corresponding mounting hole from the plurality of mounting holes.

15. The self-releasing clamping tool as claimed in claim 13 comprising:
each of the plurality of gear studs further comprising an insert-receiving receptacle;
the release mechanism comprising a coupling insert, a retaining ring, and an annular groove;
the insert-receiving receptacle normally traversing through the base gear;
the coupling insert being adjacently connected to the adapter plate;
the annular grove laterally traversing into the insert-receiving receptacle;

the retaining ring being mounted within the annular groove; and the coupling insert being engaged into the insert-receiving receptacle and the retaining ring.

16. The self-releasing clamping tool as claimed in claim 13, wherein the base gear being rotatably mounted to the release mechanism.

17. The self-releasing clamping tool as claimed in claim 13 comprising:

each of the plurality of gear studs further comprising a connector tip; and the connector tip being terminally attached to the support stud, opposite to the base gear.

18. The self-releasing clamping tool as claimed in claim 13 comprising:

each of the plurality of gear studs further comprising a top plate;

the top plate being adjacently connected to the base gear; and the top plate being positioned in between the support stud and the base gear.

19. The self-releasing clamping tool as claimed in claim 13 comprising:

an annular cover plate;

the annular cover plate being rotatably mounted in between the central gear and the lock plate; and the annular cover plate being concentrically aligned to the central hole.

* * * * *